(12) United States Patent
Foust et al.

(10) Patent No.: US 12,726,542 B2
(45) **Date of Patent: *Sep. 1, 2026**

(54) LOW BANDWIDTH PROTOCOL FOR STREAMING SENSOR DATA

(71) Applicant: Embark Trucks Inc., San Francisco, CA (US)

(72) Inventors: Caleb William Locke Foust, San Francisco, CA (US); Hourann William Bosci, San Francisco, CA (US); Konstantine Mushegian, San Francisco, CA (US)

(73) Assignee: Embark Trucks Inc., San Francisco, CA (US)

(*) Notice: Subject to any disclaimer, the term of this patent is extended or adjusted under 35 U.S.C. 154(b) by 60 days.

This patent is subject to a terminal disclaimer.

(21) Appl. No.: 18/732,068

(22) Filed: Jun. 3, 2024

(65) Prior Publication Data

US 2025/0023947 A1 Jan. 16, 2025

Related U.S. Application Data

(63) Continuation of application No. 18/094,633, filed on Jan. 9, 2023, now Pat. No. 12,034,808, which is a continuation of application No. 17/842,150, filed on Jun. 16, 2022, now Pat. No. 11,553,043.

(51) Int. Cl.

| | |
|---|---|
| ***H04L 67/12*** | (2022.01) |
| ***B60W 50/02*** | (2012.01) |
| ***B60W 50/04*** | (2006.01) |
| ***B60W 50/06*** | (2006.01) |
| ***H04L 47/34*** | (2022.01) |
| ***H04L 47/36*** | (2022.01) |
| ***H04L 47/43*** | (2022.01) |

(52) U.S. Cl.

CPC ......... *H04L 67/12* (2013.01); *B60W 50/0205* (2013.01); *B60W 50/04* (2013.01); *B60W 50/06* (2013.01); *H04L 47/34* (2013.01); *H04L 47/365* (2013.01); *H04L 47/43* (2022.05); *B60W 2556/45* (2020.02)

(58) Field of Classification Search

CPC .. B60W 50/0205; B60W 50/04; B60W 50/06; B60W 2556/45; H04L 47/34; H04L 47/365; H04L 47/43; H04L 67/12

USPC .......................................................... 370/230

See application file for complete search history.

(56) References Cited

U.S. PATENT DOCUMENTS

| | | | | |
|---|---|---|---|---|
| 10,560,281 B2 | 2/2020 | Hellenthal | | |
| 10,880,409 B2 * | 12/2020 | Maluf | H04L 69/04 | |
| 11,402,220 B2 | 8/2022 | Rabel et al. | | |
| 11,553,043 B1 * | 1/2023 | Foust | B60W 50/04 | |
| 2013/0070745 A1 * | 3/2013 | Nixon | H04W 84/02 | 370/328 |

(Continued)

FOREIGN PATENT DOCUMENTS

| | | | |
|---|---|---|---|
| AU | 2014342474 A1 | 3/2016 | |
| AU | 2018202791 A1 * | 11/2018 | H04L 47/28 |

(Continued)

*Primary Examiner* — Atul Trivedi

(74) *Attorney, Agent, or Firm* — Sheppard Mullin Richter & Hampton LLP

(57) ABSTRACT

Provided are systems, methods and computer program code for transmitting vehicle data to remote monitoring systems using a low bandwidth protocol.

20 Claims, 9 Drawing Sheets

(56) References Cited

U.S. PATENT DOCUMENTS

2016/0112216 A1 4/2016 Sargent
2018/0050704 A1 2/2018 Tascione
2019/0041835 A1 2/2019 Cella
2019/0095711 A1 3/2019 Northcutt et al.
2019/0132709 A1 5/2019 Graefe
2019/0279440 A1 9/2019 Ricci
2019/0279447 A1 9/2019 Ricci
2019/0344663 A1 11/2019 Ricci
2020/0209855 A1* 7/2020 Shen .................. B60R 16/0231
2020/0209861 A1* 7/2020 Priyadarshi ........... G05B 17/02
2020/0225655 A1* 7/2020 Cella ................. G05B 19/4184
2020/0273268 A1 8/2020 Bhattacharyya
2020/0314940 A1 10/2020 Park
2020/0394409 A1* 12/2020 Cristache .............. G06V 20/20
2021/0034042 A1 2/2021 Lee
2021/0037120 A1 2/2021 Lee
2021/0056058 A1 2/2021 Lee et al.
2021/0160315 A1 5/2021 Linn-Moran et al.
2021/0202067 A1 7/2021 Williams
2021/0312725 A1 10/2021 Milton
2021/0342020 A1 11/2021 Jorasch
2022/0066456 A1* 3/2022 Ebrahimi Afrouzi ....................... G06F 3/04883
2022/0116736 A1 4/2022 Williams
2022/0126864 A1* 4/2022 Moustafa .......... B60W 60/0013
2022/0141708 A1 5/2022 Arrobo Vidal et al.
2022/0188867 A1* 6/2022 Farmer .................. H04W 4/38
2022/0201757 A1 6/2022 Cruz et al.
2022/0248296 A1 8/2022 Merwaday et al.
2022/0374515 A1 11/2022 Bridges
2023/0110467 A1* 4/2023 Jha .................. G08G 1/096791 701/24
2023/0353422 A1* 11/2023 Neumann ........... H04L 12/4641
2025/0097047 A1* 3/2025 Cai .................... H04L 63/1416
2025/0335408 A1* 10/2025 Chowdhary ........ G06F 16/2228

FOREIGN PATENT DOCUMENTS

DE 102021110736 A1 12/2021
ES 2445718 T3 * 3/2014 ........... H04L 47/245
WO 2019/134758 A1 7/2019
WO WO-2020139377 A1 * 7/2020 ......... G01C 21/3856
WO WO-2020139395 A1 * 7/2020 ............. H04L 67/55
WO WO-2021194590 A1 * 9/2021 ............. G06V 20/58
WO 2022/075769 A1 4/2022

* cited by examiner

LOW BANDWIDTH PROTOCOL FOR STREAMING SENSOR DATA

RELATED APPLICATION

This application is a continuation of, and claims benefit of and priority to, U.S. patent application Ser. No. 18/094,633, filed on Jan. 9, 2023, which is a continuation of U.S. patent application Ser. No. 17/842,150 filed on Jun. 16, 2022, the entire contents of which are incorporated herein by reference for all purposes.

BACKGROUND

Autonomous or semi-autonomous vehicles rely on a substantial amount of sensor and other vehicle data to understand the road, the state of the vehicle and the state of the environment around the vehicle. It would be desirable to provide this data to remote systems so that the remote systems could assist in monitoring or interacting with the vehicles while in operation. Unfortunately, many vehicles, such as long-haul trucks, often traverse rural stretches of road with poor connectivity making it difficult to reliably transmit vehicle or sensor data to remote systems.

SUMMARY

Provided are systems, methods and computer program code for transmitting vehicle data to remote monitoring systems using a low bandwidth protocol. Some embodiments include vehicle computing systems with memories configured to store data associated with operation of a vehicle including data captured by at least a first sensor of the vehicle, and a processor configured to monitor the memory to identify updated data. The system further identifies, for at least a first item of updated data, a type of the updated data, the type including one of vehicle signal data, vehicle diagnostic data, and object data and then creates a frame including the updated data, the frame formatted based on the type of the updated data. A header is generated, the header including information identifying (i) the type of the updated data, (ii) a vehicle identifier, and (iii) a timestamp. The header and a message body including at least some of the data from the frame are transmitted to a remote vehicle monitoring system.

Some embodiments include a remote vehicle monitoring system configured to receive the header and message body and to recreate the frame and stream the data to one or more user devices for display to users.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
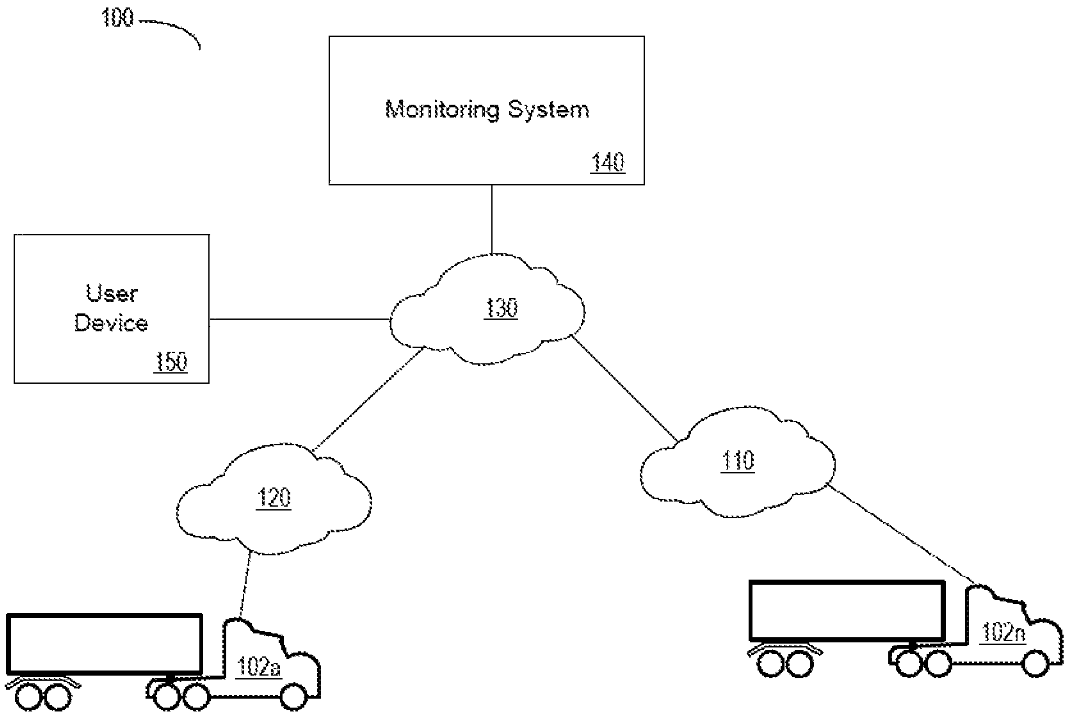
FIG. 1 is a diagram illustrating an example of a communication environment in which a semi-truck may operate pursuant to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Features of some embodiments will now be described by first referring to FIG. 1 which depicts an example communications environment in which embodiments of the present invention may be used. As shown in FIG. 1, a system 100 may include one or more semi-trucks 102*a-n* which are in communication with a remote monitoring system 140 via one or more networks 110, 120, 130. One or more user devices 150 may also be in communication with the remote monitoring system 140 (and, in some embodiments, with one or more semi-trucks 102) via one or more networks 110, 120, 130.

To introduce features of some embodiments, an illustrative example will now be provided by reference to FIG. 1. In the illustrative example, a number of semi-trucks 102 are in operation, traversing different areas of the country. Each semi-truck 102 is in communication with a remote monitoring system 140 via different networks. For example, one semi-truck 102*a* may be on a remote section of interstate highway in the desert of Nevada and may be in communication with a network 120. The network 120 may be a satellite network with poor coverage (e.g., such that messages transmitted over the network 120 may be received unreliably and with varying degrees of latency). Another semi-truck 102*n* may be on a less remote section of interstate on the East Coast and may be in communication with a cellular network 110 having excellent coverage. Both semi-trucks 102 are being driven in a semi-autonomous fashion (e.g., with a driver present in the vehicle but with the vehicle currently being controlled by a self-driving system). Embodiments allow both semi-trucks 102 to be in communication with the remote monitoring system 140 in a manner that allows sensor and other data associated with each semi-truck 102 to be transmitted to the remote monitoring system 140 even though some of the transmissions may be dropped or subject to delays or other latency. Further, the remote monitoring system 140 may have sufficient information about the operating status of the trucks 102 to perform control actions such as, for example, terminating the self-driving system and returning control of the semi-truck 102 to the driver.

Embodiments are able to reliably transmit such information to the remote monitoring system 140 based on use of a low bandwidth protocol for transmitting or streaming data from the semi-trucks 102 to the remote monitoring system 140 as will be described further herein. This low bandwidth protocol allows operational and status data to be transmitted with low latency and is preferably used with low-bandwidth data types. In some embodiments, data is transmitted in different data frames based on data types, although in some embodiments, the different types of data may be treated in a single data frame. Embodiments will be described where the data is broken into different data frames. For example, in one specific illustrative embodiment, the data transmitted from a semi-truck 102 may include data associated with vehicle signals (in a first data frame), data associated with monitoring diagnostics (in a second data frame) and data associated with tracked objects (in a third data frame). The use of three data frames is described for illustrative purposes and those skilled in the art, upon reading the present disclosure, will appreciate that different numbers of data frames and different aggregations of data may be used pursuant to some embodiments.

All three data frames may be transmitted to the remote monitoring system 140 in different frequencies and separately compressed. For example, it may be the case that the vehicle signal data needs to be transmitted at a higher frequency than the monitoring and diagnostic data. By treating the different types of data separately, such adjustments may be made, thereby increasing the chances of successful reception of data by the remote monitoring system 140. Further, as will be discussed further below, in some embodiments, the data received by the remote monitoring system 140 is used to render one or more user interfaces on user devices 150. In some embodiments, by breaking the data into different groups that are transmitted separately, the chance of a user interface not having any data is reduced. For example, while there may be a problem receiving some packets of diagnostic data, if the vehicle signal data has been received, the user interface may still display the vehicle signal data for viewing by a user interacting with a user device 150.

Pursuant to some embodiments, each data frame is transmitted with a message header that includes a timestamp and a vector clock or counter that increments with each frame sent. This message header data allows the frame recipient to reorder or recreate a sequence of messages if any frame is received out of order.

Those skilled in the art, upon reading the present disclosure, will appreciate that other data types may be transmitted. Further, while one frame or three frames are described, other combinations may be used (e.g., such as more than three frames). While only two semi-trucks 102, a single monitoring system 140 and a single user device 150 are shown in FIG. 1, in practical application, multiple ones of each may be provided in a system pursuant to the present invention. Further, while semi-trucks are described, those skilled in the art will appreciate that the low bandwidth protocol of the present invention may be used in conjunction with other moving vehicles as well.

Figure 2:
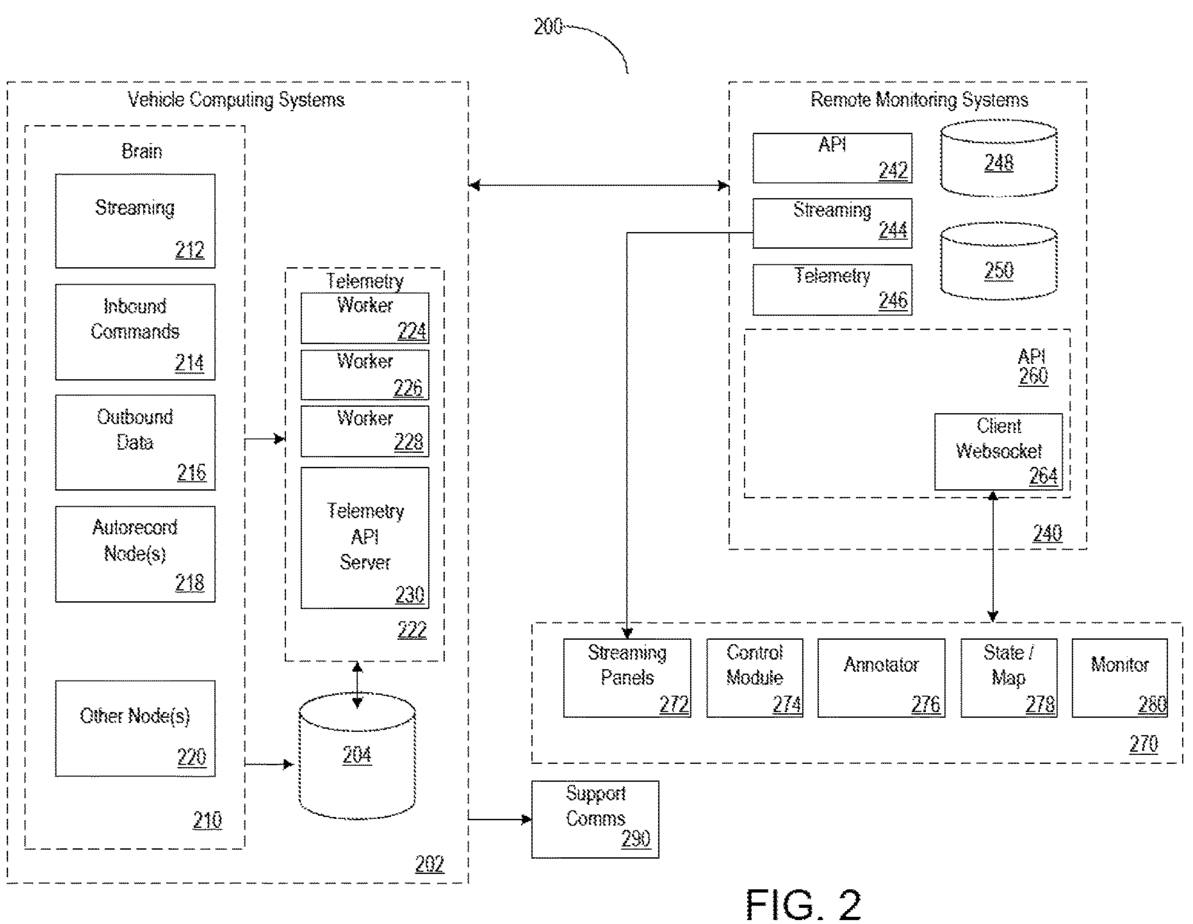
FIG. 2 is a diagram illustrating a system pursuant to some embodiments.

Reference is now made to FIG. 2 where a system diagram 200 is shown which depicts vehicle computing systems 202 that are associated with the semi-truck 102, remote monitoring system 240, and components 270 that are associated with the user device 150. The vehicle computing systems 202 may act in conjunction with other vehicle sensors and systems such as those shown in the semi-truck 700 described in conjunction with FIGS. 7A-7C as well as the control systems 600 of FIG. 6. That is, in practical application, the vehicle computing systems 202 shown in FIG. 2 are deployed on a vehicle in conjunction with other vehicle sensors and systems.

In general, the vehicle computing systems 202 include components related to a vehicle "brain" (or central processing unit) 210, components related to telemetry 222, and components related to data storage 204. The vehicle computing systems 202 may include a number of other components such as sensors and the like (including those shown and described further below in conjunction with FIG. 6). For the purposes of describing components relating to the transmission of low-bandwidth data packets pursuant to the present invention, only selected components are shown in FIG. 2. Pursuant to some embodiments, the brain 210 includes components or modules configured to perform processing including one or more streaming modules 212, one or more inbound command nodes 214, one or more outbound data nodes 216, one or more auto-record nodes 218 and possibly one or more other nodes 220.

Figure 5:
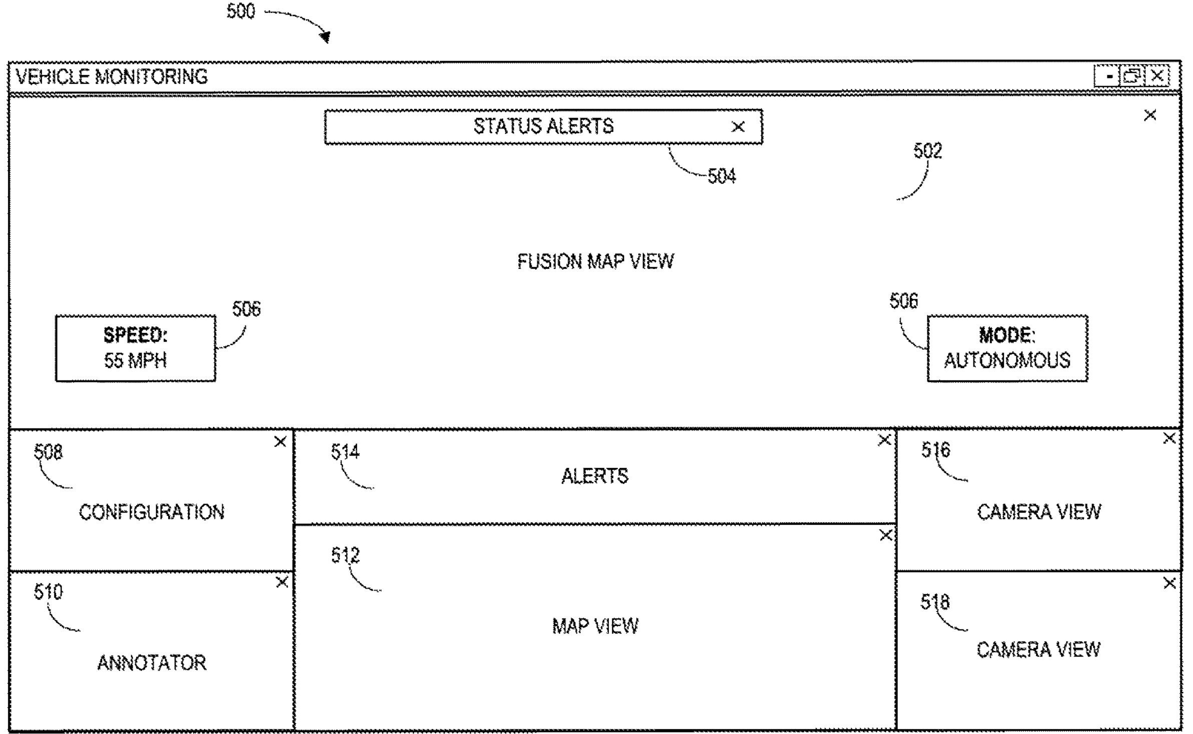
FIG. 5 is a diagram illustrating a user interface that may be generated pursuant to some embodiments.

In general, the streaming modules 212 are configured to receive streaming data from one or more sensors associated with the semi-truck. For example, referring briefly to FIG. 6, one or more cameras 612, lidars 614 and other sensors configured to capture video and other data may be in communication with the streaming modules 212. The streaming modules 212 may be configured to stream the received video and other data to one or more remote monitoring systems 240, e.g., via a real-time transport protocol (RTP) interface or an MQ telemetry transport (MQTT) interface, and to a module such as the streaming module 244 of the remote monitoring system 240. In this manner, embodiments publish or stream sensor and camera data associated with the vehicle to a remote monitoring system 240. As will be described further below, the streamed data may further be published or streamed from the remote monitoring system 240 to one or more user devices 150 for viewing by one or more users (e.g., such as via a user interface 500 such as shown in FIG. 5).

The inbound command node(s) 214 of the brain 210 may be components configured to receive data or commands from other components. In some embodiments, the inbound command node(s) 214 receive these commands and data by subscribing to topics published by other sensors and devices on the vehicle (such as the control systems 600 of FIG. 6) or from remote systems (such as systems 240 and 270). In some embodiments, the inbound command node(s) 214 may subscribe to a message queue or publish/subscribe system (such as Redis or the like as described further below) to receive control signals from the remote monitoring system 240. In some embodiments, after receiving such a control signal, the inbound command node(s) 216 may send an acknowledgement message allowing the control signal to be cleared from the queue.

The outbound data node(s) 216 may subscribe to topics that are associated with vehicle signal data, diagnostic data, and tracked object data. For example, the outbound data node(s) 216 may monitor or subscribe to data streams published by other components of the systems associated with the vehicle (such as those shown in FIG. 6) and as data updates are received, the outbound data node(s) 216 may initiate the creation of the frame data for transmission to the remote monitoring systems 240. In some embodiments, the outbound data node(s) 216 initiate creation of the frame data (e.g., by providing the relevant vehicle signal data, diagnostic data or tracked object data) and then passes the frame data to one or more other node(s) for serialization, addition of header data and creating any frame chunks.

Pursuant to some embodiments, the vehicle signal data may include data such as: a self-driving mode of operation, speed, acceleration, engine speed, compass heading, location (latitude and longitude), a state of a vehicle planner (such as applications 672-674 of FIG. 6), a mode of operation (such as highway mode), a steering wheel angle, trailer angle, wheel RPM, lane location on a map, turn signal status, etc. Pursuant to some embodiments, the monitoring diagnostic data may include diagnostic data from various vehicle systems. Because the diagnostic data may often consist of long strings, the diagnostic data may also be processed to construct a mapping of diagnostic message status names to integers. The monitoring diagnostic frame data may then be transmitted using the mapped integers rather than the whole string. As used herein, this mapping of status names to integers may be referred to as providing a "context". The context (or mapping) may be transmitted to the remote monitoring system 140 in a separate interval from the transmission of the diagnostic frame data. For example, the context data may be updated every five minutes (with only new context or mapping being transmitted to the remote monitoring system 140) while the diagnostic data may be sent more frequently. If a context update fails to be sent for some reason, a retry may be performed a short period later (e.g., such as 1 minute later). Pursuant to some embodiments, even with context, the diagnostic messages may become large (and may be too large to transmit via over a socket as described herein) and as a result, these messages may be compressed (e.g., such as by using gzip) and broken into smaller chunks (such as, for example, 2 kb chunks).

Pursuant to some embodiments, the tracked object data may include information associated with positional data associated with the semi-truck 102 as well as (in some embodiments) information associated with positional data associated with objects around the semi-truck 102 that are being tracked. For example, the tracked object data may include data associated with the bounding boxes of objects around the vehicle that are currently being tracked as well as planning data generated by computing systems on the vehicles (as will be described further below in conjunction with FIG. 2) associated with a computed trajectory of the semi-truck 102 and/or with each of the tracked objects. In general, the data in the tracked object data frames is usually below the size limits associated with the transmit protocol described below, but in some situations can exceed it. In those situations, the tracked object data frame information may be compressed (e.g., such as by using gzip) and broken into smaller chunks (such as, for example, 2 kb chunks).

As discussed above, chunking may be performed as needed when the frame data size is over a limit, such as, for example 64 kilobytes in embodiments where the frame data is transmitted via User Datagram Protocol or "UDP" as described further herein. In practical application, in some network environments, the limit may be configured to be lower (e.g., such as 2048 bytes). In some embodiments, the frame data size limit may be a variable limit and may be reduced in environments with poor network conditions. Pursuant to some embodiments, the outbound data node(s) 216 perform any required processing to break frame data into chunks. The outbound data node(s) 216 may also perform processing to serialize the message. In some embodiments, the outbound data node(s) 216 serialize the message using Concise Binary Object Representation ("CBOR") in accordance with IETF RFC 8949. For example, each message can be encoded into a CBOR-encoded array. Applicants have found that using arrays saves space (as compared to, for example, sending dictionaries with key names). The arrays are configured such that the order of items in the array matches the order of items in the brain 210 as well as the order of items when retrieved by a frontend device (such as the user interface 500 of FIG. 5).

The outbound data node(s) 216 may further be configured to generate a header for each frame. In some embodiments, a header may include a message type, a vehicle identifier, a context ID (if the frame is a diagnostic frame), a sequence identifier of the frame (where the sequence is incremented for each frame sent), a chunk index identifier and a total number of chunks in the frame (if the frame has been broken into chunks), and a message timestamp (preferably, the message timestamp is the same for all chunks that are part of the same frame).

In some embodiments, the inbound command node(s) 214 and the outbound data node(s) 216 are in communication with one or more worker nodes 224-228 as well as a telemetry API server 230. The worker node 224 and the telemetry API server 230 allow the transmission of low-bandwidth telemetry data from the vehicle computing system 202 to the remote monitoring system 240. Further, the worker node 224 provides connection management and DNS caching, helping to improve transmission performance. Pursuant to some embodiments, the outbound data node(s) 216 monitor and identify data to be sent in different frames, initiate the creation of those frames, perform serialization and chunking (if needed), add headers, and transmit the frames via the telemetry module 222 to one or more remote monitoring systems 240. In general, the brain 210 generates and sends a binary blob of packet data through a telemetry worker 224 to a remote monitoring system 240 via a UDP socket.

While separate nodes are described as performing the functions of inbound command nodes(s) 214 and outbound data node(s) 216, the functions may be combined into one or more modules or nodes. In some embodiments, the frames are broken into chunks in the brain 210 (e.g., in the outbound data node 216 or the inbound command node 214) by generating the frame contents, serializing and optionally compressing the frame contents, breaking the binary data into 2048-byte chunks (if needed), and then sending each chunk as a UDP message over a socket to a telemetry worker 224 in the telemetry subsystem 222. The telemetry subsystem 222 then resends each chunk (verbatim) to the remote monitoring systems 240 (e.g., to a telemetry service 246). In some embodiments, the remote monitoring systems 240 are deployed using Kubernetes and the telemetry service 246 is an ingestor that is configured to receive the chunks via UDP. While 2048-byte chunks are currently used, other size chunks may also be used depending on the network conditions in which the system of the present invention is used.

In some embodiments, the context data may be hashed allowing the system to quickly check to determine if the context data has changed (if the hash is different, then the data has changed). This can be used to reduce the times that context data need to be transmitted, thereby further reducing the bandwidth needs of the system. In some embodiments a context identifier may be added to the header data to allow contexts to be expired in a publish/subscribe datastore (such as Redis or the like as described further below) once messages using the contexts are no longer received. In some embodiments, some of the message data that is sent in frames and transmitted via the telemetry workers 224 to the remote monitoring system 240 may instead be transmitted directly to the front end (e.g., via components 270). For example, diagnostic data may be sent to both the remote monitoring system 240 and to the components 270. This allows certain components (such as the front end components) to be reused in different applications. For example, the diagnostic data may be transmitted directly to the front end in environments with different network configurations (such as, for example, a maintenance facility) allowing the same front end system to be directly connected to vehicle I/O (such as the interfaces 648 of FIG. 6).

The system 200 includes components 270 that may, in some embodiments, be deployed on one or more user devices (such as the device 150 of FIG. 1). For example, a user operating a laptop or some other computing device may interact with a user interface (such as the user interface 500 of FIG. 5) to view vehicle diagnostic, streaming and other data provided by the vehicle computing systems 202 as described herein. A user operating a user device 150 may interact with a user interface to request information about a particular vehicle (e.g., such as a semi-truck 102 of FIG. 1). Once a particular vehicle is identified, the components 270 interact with the remote monitoring systems 240 to subscribe to data associated with that vehicle.

The components 270 may include one or more streaming panels 272 which receive streaming data from a streaming component 244 of the remote monitoring systems 240. The streaming data is associated with the selected vehicle and may include video data, lidar data or the like. Embodiments also receive frame data via one or more websockets 264. The frame data is the frame data produced by the outbound data nodes 216 and which is transmitted from the vehicle to the remote monitoring systems 240 (and which are reconstructed by the remote monitoring systems 240) using a low bandwidth protocol as described herein. In some embodiments, the frame data received by the telemetry component 246 is stored or cached in a datastore such as a Redis cache 250. When a user device requests to subscribe to or receive data associated with a vehicle, the frame data associated with that vehicle is published to the user device and provided to the user device via a websocket 264. When the user device subscribes to information about a specific vehicle, in some embodiments, that subscription ensures that the user device receives frame data associated with each of the different message types (e.g., signal data, diagnostic data and object tracking data). In some embodiments, a user device must subscribe to both a specific vehicle as well as a specific message type.

The frame data may be reconstructed in sequence and displayed to a user via a user interface (such as the interface 500 of FIG. 5). In some embodiments, the remote monitoring system 240 performs the reconstruction or sequencing of the frame data. In some embodiments, the components 270 associated with each user device 150 perform the reconstruction or sequencing of the frame data as it is received at the user device 150. Different frame data types may be displayed differently to the user. For example, frame data associated with tracked objects may be manipulated to cause a graphical depiction of the vehicle and its surroundings to be displayed to the user. Interpolation and smoothing may also be performed in the front end so that the graphical depiction shows smooth motion at, for example, 60 frames per second (even though data frames are actually arriving less often). As new tracked object frame data is received, the user interface is updated to display movement of the vehicle and surrounding objects. Diagnostic frame data may be displayed in one or more diagnostic components of the user interface, and diagnostic data of particular interest may be highlighted for a user (e.g., by flashing error messages in red or the like). Information from vehicle signal data frames may further be displayed to the user (e.g., after context mapping is applied to provide labels for the data).

In some embodiments, the context data map generated by the vehicle computing systems 202 is transmitted from the vehicle to the remote monitoring system 240 and is then passed on to the components 270 associated with each user device 150. When data associated with a context data map is rendered in a user interface, the context data map is used to provide labels for the data. As discussed above, diagnostic data from the vehicle may be associated with a context data map (to reduce the size of diagnostic data type frame data). When diagnostic data is rendered in the user interface, the corresponding label for each value in the diagnostic data frame is retrieved from the context map and the label is displayed with the value on the user interface. This substantially reduces the bandwidth required to transmit the diagnostic frame data from the vehicle to the remote monitoring systems (and subsequently to the user device 150) while still allowing detailed information to be displayed to a user.

In some embodiments, a user operating a user device 150 may also be able to interact with a control module 274 to cause messages or control signals to be transmitted to the vehicle. The control module 274 may transmit a control signal via the client websocket 264 to the Redis cache 250. In some embodiments, each vehicle (via a worker 224) may subscribe to a control message queue so that when a control message is published to the cache 250 the worker 224 receives the message and can route it to a node such as the inbound command node(s) 214. In some embodiments, as messages are received by the inbound command node(s) 214, the node will send an acknowledgement message. The message queue may be monitored and any messages that have not been acknowledged (e.g., after a set period of time) may be retried. This improves reliability in remote environments. In some embodiments, one type of control signal that may be transmitted from the user device 150 is a control signal that causes the vehicle to cease operation in an autonomous or semi-autonomous mode of operation and return control to a human driver. Other control signals or messages may include messages that communicate information to a human driver in the vehicle alerting them of conditions or information identified by a user operating a remote user device 150.

Figure 3:
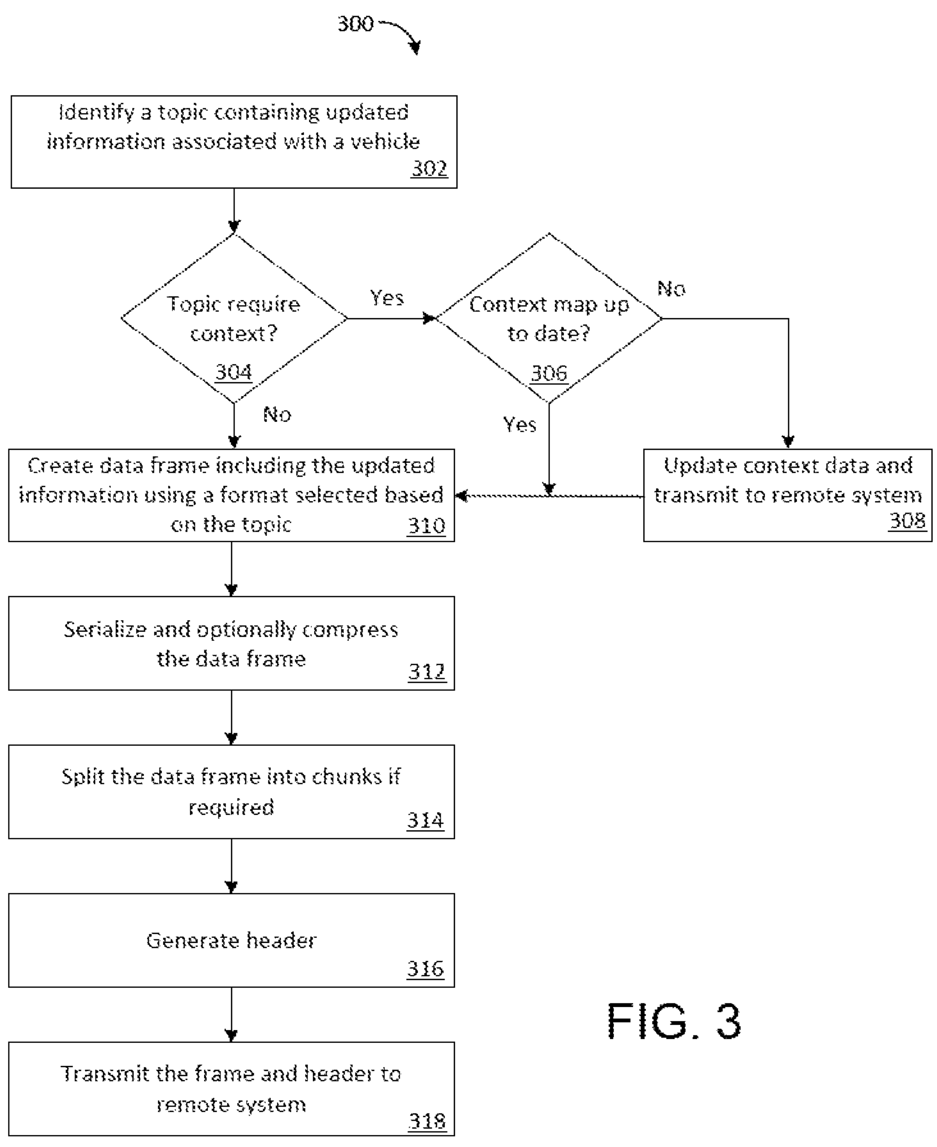
FIG. 3 is a flow diagram illustrating a process pursuant to some embodiments.

FIG. 3 illustrates a process 300 for transmitting data from a vehicle (such as semi-truck 102) to a remote monitoring system 240 using a low bandwidth protocol pursuant to some embodiments of the present invention. The process 300 may be performed, for example, using vehicle computing systems deployed on a semi-truck 102 or other vehicle, such as the vehicle computing systems 202 of FIG. 2. The flow charts described herein do not imply a fixed order to the steps, and embodiments of the present invention may be practiced in any order that is practicable. Note that any of the methods or processes described herein may be performed by hardware, software, or any combination thereof. For example, a computer-readable storage medium may store thereon instructions that, when executed by a machine or processor, result in performance according to any of the embodiments described herein.

In some embodiments, the process 300 may be continually running during operation of the semi-truck 102. That is, while the vehicle is in operation, embodiments may continually be monitoring the sensor data and data storage 204 to identify data to be transmitted from the vehicle to the remote monitoring systems 240. Embodiments allow remote users (such as users interacting with user devices 150) to monitor the operation of autonomous or semi-autonomous vehicles even when those vehicles are operating in areas with poor network conditions. Embodiments use low bandwidth streaming data protocols to ensure that remote users are able to view current operating data associated with one or more vehicles. In some embodiments, different users operating user devices 150 may be simultaneously monitoring the status and operating data associated with a plurality of semi-trucks 102 in different locations.

Process 300 begins at 302 where the vehicle computing system 202 (and more particularly, where one or more nodes of the system 202) identify a topic containing updated information associated with the vehicle. For example, a topic may be data associated with a type of message or a type of data such as signal data, diagnostic data, object data, etc. In some embodiments, data generated or produced by sensors and other components is stored in a datastore 204. In some embodiments, the datastore 204 may be or include a publish/subscribe message broker component (such as, for example a Redis datastore described at https://redis.com, or the Robot Operating System framework described at https://ros.org) and the inbound command node(s) 214 and outbound data node(s) 216 may subscribe to receive updates on desired topic(s) from the datastore 204.

Processing continues at 304 where a determination is made whether the topic requires a context map. For example, as discussed above, in some embodiments, topics such as the diagnostics topic use a context map to replace label data with identifiers. This allows smaller messages to be transmitted. If processing at 304 determines that the topic is one that uses a context map, then processing continues at 306 where a determination is made whether the context map is up to date. For example, in some situations, the labels associated with diagnostic information may change or be updated. If so, processing may continue at 308 where the context map data is updated. In some embodiments, once the context map data is updated, the updated context map may be transmitted to the remote monitoring system 240 (and/or to one or more user devices 150) for use in associating label information with the diagnostic data that will be transmitted from the vehicle. The processing at 304, 306 and 308 may be performed at other times and are shown as being performed at the start of process 300 for illustration only.

Processing continues at 310 where the outbound data node(s) 216 are operated to create a data frame including the updated information. The data frame is created in a format that may vary based on the topic the data is associated with. For example, data associated with diagnostics may use a diagnostic type format, while data associated with signals may use a signal type format. Processing continues at 312 where the data frame is serialized and optionally compressed. For example, pursuant to some embodiments, the data is serialized using a binary format. For example, in some embodiments, the data is serialized using an open source approach such as by using Concise Binary Object Representation (CBOR) to minimize the size of the data frame. If the data frame is unusually large, it may also be compressed using, for example zlib/gzip or the like.

Processing continues at 314 where the data frame may be split into chunks. For example, if the data frame is greater than 2048-bytes in size, the data frame may be split into multiple smaller chunks (e.g., using a module or other component configured to split data frames into smaller chunks). Processing continues at 316 where a header for the data frame is generated. In some embodiments, if the data frame was split into multiple chunks, the header will include a sequence identifier for the frame (which identifier will be the same for each chunk that is part of the same frame) as well as an index for each chunk and a total number of chunks in the frame. Whether a data frame is chunked or not, each frame header will include a version, a message type (identifying whether the frame includes signal data, diagnostic data or object data), a vehicle number or identifier, and a timestamp. If the message type is a type that requires a context map, the header will also include a context ID (identifying the current context map associated with the data).

Processing continues at 318 where the frame (in chunks if chunked) and header data are transmitted to the remote monitoring system 240. Pursuant to some embodiments, the frame and header data is transmitted as a UDP message over a socket to a service (such as a telemetry service 246) on the remote monitoring systems 240. The UDP protocol is a protocol that allows low-latency and loss-tolerating transmission and allows the frame data and header to be transferred to the remote monitoring system 240 without requiring an acknowledgement from the remote monitoring system 240 (unlike communications that use TCP/IP protocols). This provides advantages in difficult network conditions. In embodiments where the frame was broken into chunks, processing at 318 includes transmitting each chunk with a header to the remote system via UDP. Once the frame data has been transmitted, processing continues at 302 if new data is identified. The process 300 may be performed in a multi-threaded manner as multiple frames may be generated substantially in parallel as updated data is received.

Figure 4:
FIG. 4 is a flow diagram illustrating a further process pursuant to some embodiments.
Figure 4:
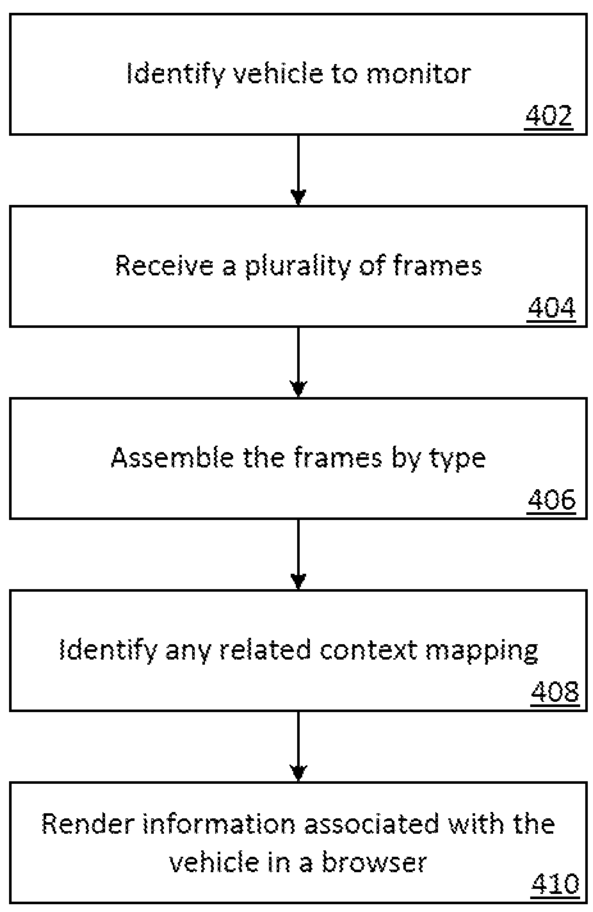

Reference is now made to FIG. 4 where a process 400 is shown which may be performed by a user device such as the user device 150 of FIG. 1. In some embodiments, the user device 150 is configured with components 270 of FIG. 2. The process 400 begins at 402 where a user operating the user device 150 provides information identifying a vehicle to be monitored. For example, the user may enter information associated with a vehicle identifier or select a vehicle from a list of vehicles currently available for monitoring. The selection of the vehicle identifier is used to subscribe the user device 150 to topics associated with that vehicle. This may include subscribing to streaming data 244 as well as frame data (received over client websocket 264). The remote monitoring systems 240 may use a publish/subscribe messaging system so that any updates to topics associated with the selected vehicle are transmitted to the user device 150.

Processing continues at 404 where the user device 150 receives a plurality of frames. Pursuant to some embodiments, processing at 404 includes receiving a plurality of frames for each message type in parallel. For example, signal data may be received (and subsequently assembled and transmitted) in parallel with diagnostic data and object data. The frame data is received over the client websocket 264 and is provided to a relevant front end module 270, such as self-driving or autonomy state and map module 278 (in the case that the frame data is signal data type or object data type) or to a diagnostics monitor module 280 (in the case that the frame data is diagnostic data type). The front end module 270 acts to ensure the frame data is in the right sequence (e.g., using the timestamp and sequence ID from the header of each chunk or frame), determines at 408 if the data type requires a context mapping (and if so, applies the context mapping to generate labels), and then acts to cause the frame data to be displayed on a user interface of the user device 150. In some embodiments the frame data is displayed in different areas of the user interface as shown in FIG. 5. This process 400 continues until the user operating the user device 150 terminates the session or until the vehicle ceases publishing the frame data.

FIG. 5 illustrates an interactive remote operator display 500 in accordance with some embodiments. The display 500 may be viewed by remote users to monitor the status, location and operation of a vehicle such as a semi-truck 102. For example, the display 500 may be displayed on a display device of a user device 150 or a display device associated with remote monitoring system 270. In general, the display 500 may be accessed by any authenticated user via an http or https connection. In the example embodiment depicted in FIG. 5, the display includes a number of areas 502-518 which display different items of data. In some embodiments, the different display areas 502-518 may be resized and repositioned by a user by dragging each area to different locations within the display 500. Some or all of the display areas 502-518 may be configured to receive data from remote monitoring system 240 and some of the display areas 502-518 may receive data directly from the vehicle computing systems 202 of a semi-truck 102 in operation.

For example, one or more areas 516-518 may receive streaming data (e.g., they may receive video data and function as streaming panels 272). As shown, the two areas display different camera views from the vehicle (for example, camera view 516 may display a view of a camera in the cab of a semi-truck 102 showing the driver, thereby allowing the remote operator to confirm that the driver is awake and alert, while camera view 518 may display a view from the front of the semi-truck 102 showing road conditions in front of the semi-truck 102). A remote operator interacting with the display 500 may interact with configuration options 508 to select different data sources (e.g., such as different camera views). While a number of different types of data sources may be fed to display areas 502-518, a few examples (in addition to the cameras and streaming data sources discussed above) include: a fusion map view 502 displaying the vehicle's current orientation, speed, mode of operation, lane position, one or more status alerts 504 indicating status changes (e.g., such as an alert when a lane change is being initiated or when a lane change has been completed), monitor alerts 514 (e.g., such as diagnostic or hardware alerts that should be reviewed), a map view 512 showing the vehicle's route and location, and an annotator 510 or communication module that allows the remote operator to transmit messages or commands or make annotations for other operators.

Embodiments allow the display 500 to display different types of data and information about a semi-truck 102 in operation even while the semi-truck 102 is operating in a poor network environment.

Figure 6:
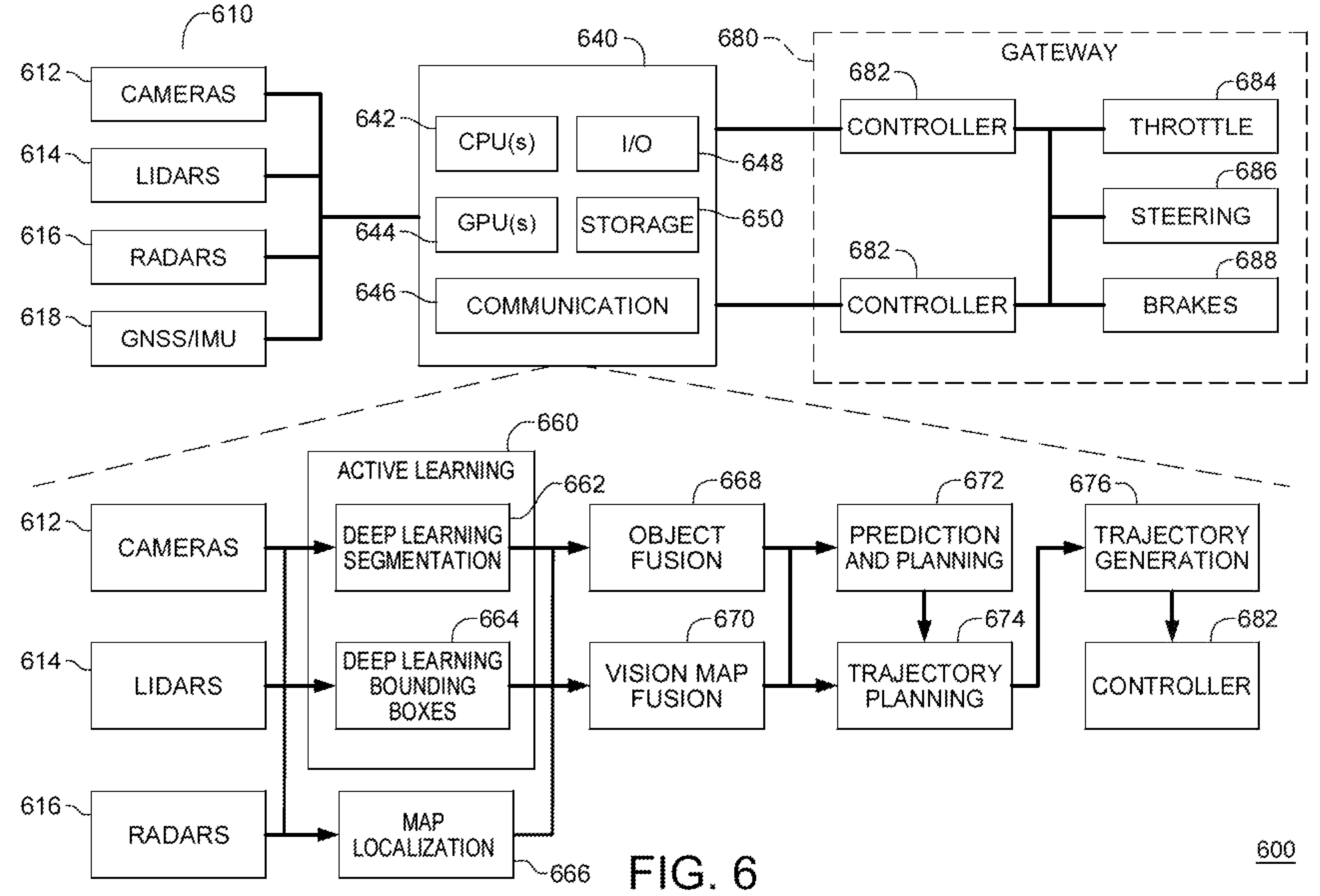
FIG. 6 is a diagram illustrating a control system that may be deployed in a vehicle such as the semi-truck depicted in FIGS. 7A-7C, in accordance with an example embodiment.
Figure 7A:
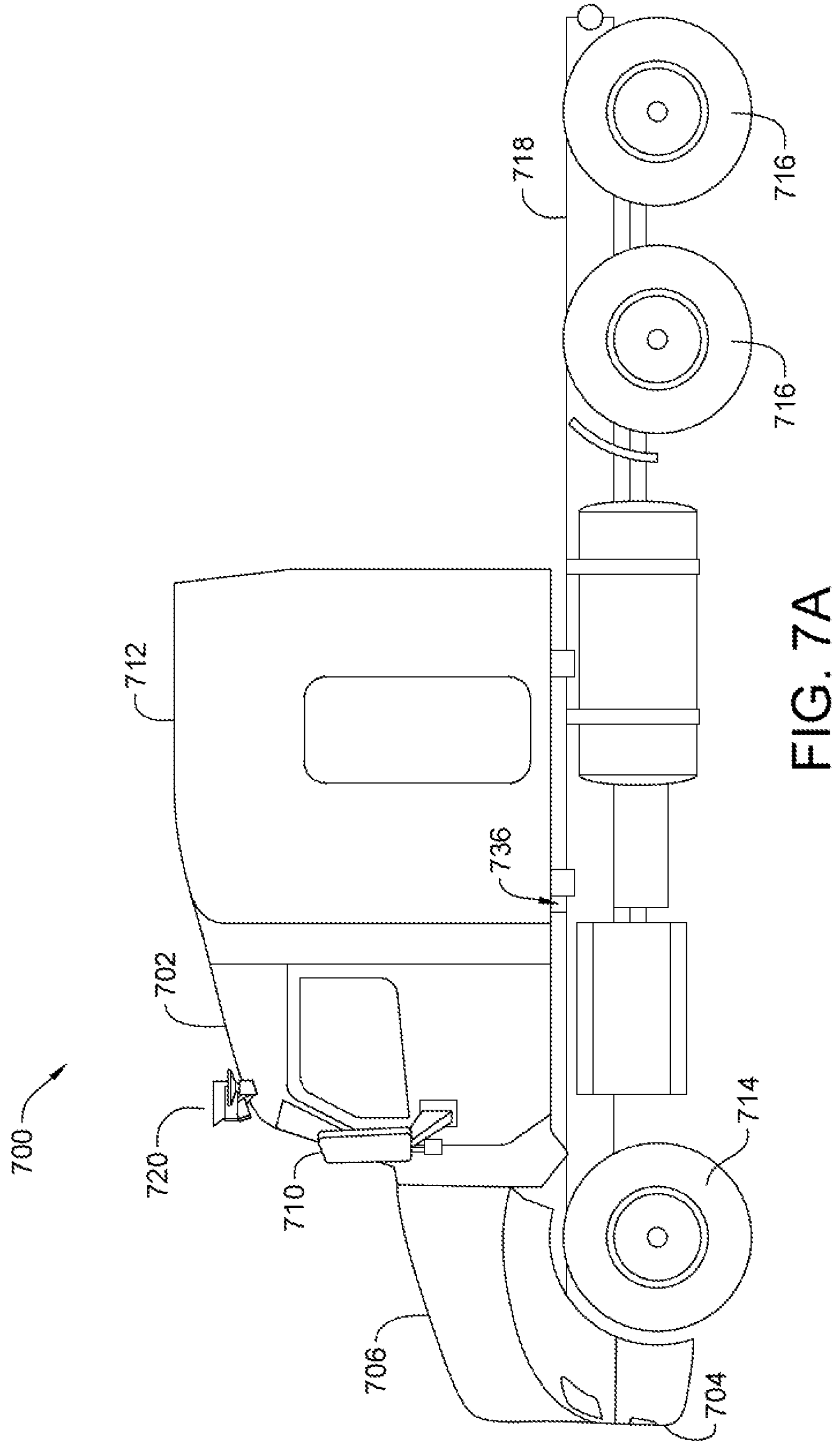
FIGS. 7A-7C are diagrams illustrating exterior views of a semi-truck that may be used in accordance with example embodiments.
Figure 7B:
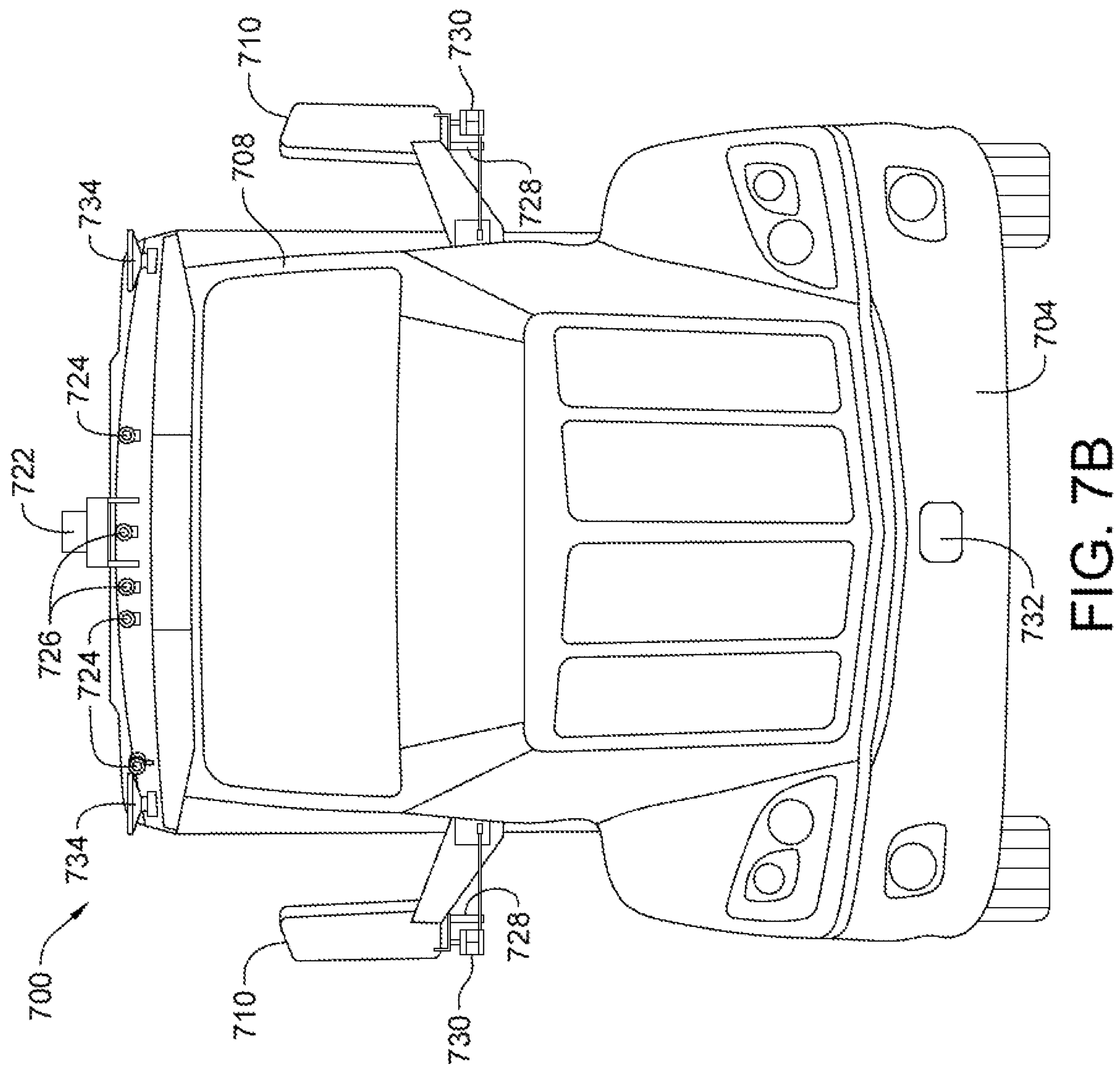
Figure 7C:
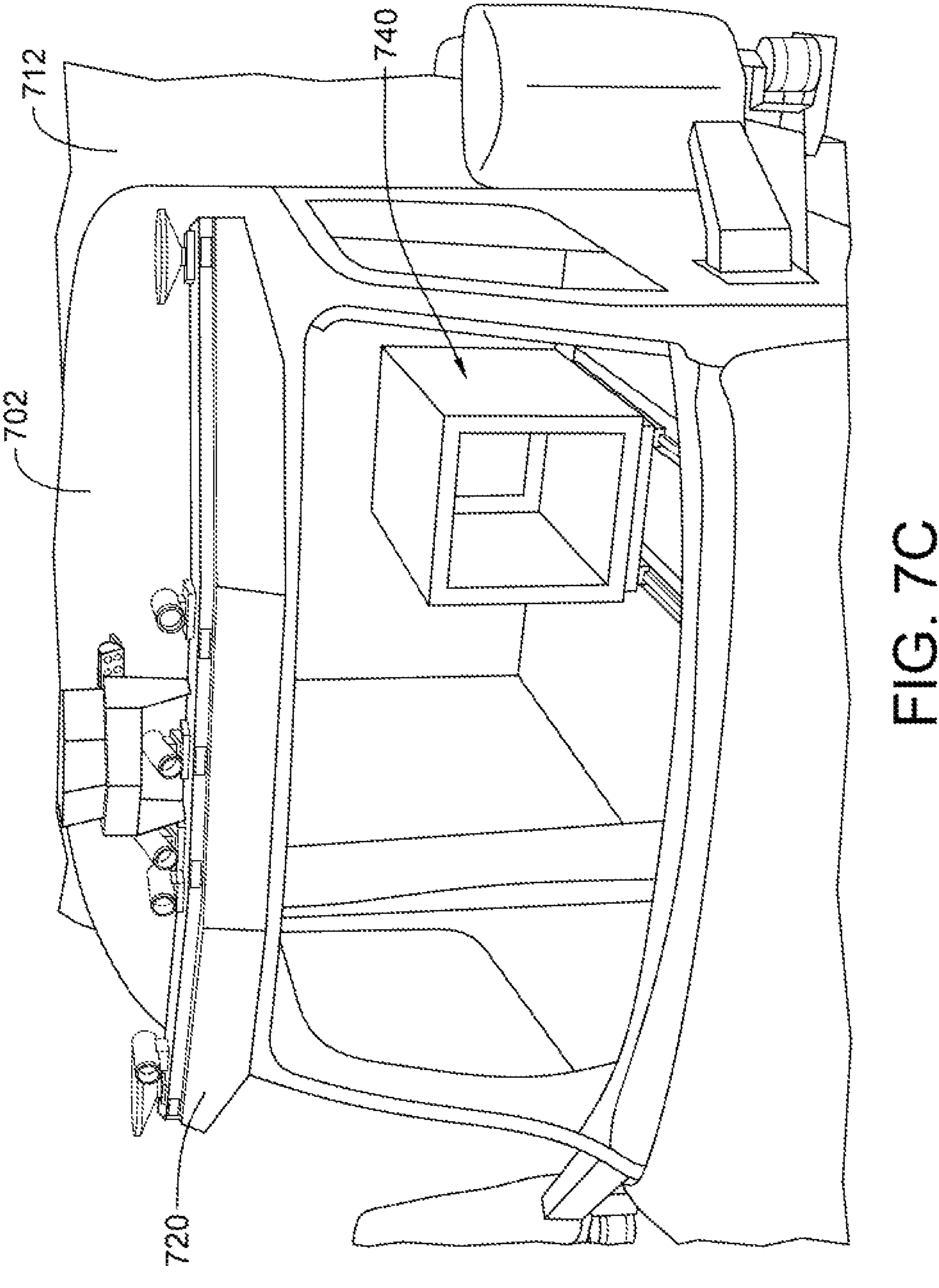

FIG. 6 illustrates a control system 600 that may be deployed in a vehicle such as the semi-truck 700 depicted in FIGS. 7A-7C, in accordance with an example embodiment. Referring to FIG. 6, the control system 600 may include a number of sensors 610 which collect data and information provided to a central computer system 640 to perform operations including, for example, control operations which control components of the vehicle via a gateway 680. Pursuant to some embodiments, the gateway 680 is configured to allow the central computer system 640 to control a number of different components from different manufacturers.

The central computer system 640 may be configured with one or more central processing units (CPUs) 642 to perform processing to implement features of embodiments of the present invention as described elsewhere herein as well as to receive sensor data from sensors 610 for use in generating control signals to control one or more actuators or other controllers associated with systems of the vehicle (including, for example, actuators or controllers allowing control of a throttle 684, steering systems 686, brakes 688 or the like). In general, the control system 600 may be configured to operate the semi-truck 700 in an autonomous (or semi-autonomous) mode of operation.

For example, the control system 600 may be operated to capture images from one or more cameras 612 mounted on various locations of the semi-truck 700 and perform processing (such as image processing) on those images to identify objects proximate or in a path of the semi-truck 700. Further, one or more lidar 614 and radar 616 sensors may be positioned to sense or detect the presence and volume of objects proximate or in the path of the semi-truck 700.

Other sensors may also be positioned or mounted on various locations of the semi-truck 700 to capture other information such as position data. For example, the sensors may include one or more satellite positioning sensors and/or inertial navigation systems such as GNSS/IMU 618. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 618 sensors may be used in conjunction with features of the present invention. The data collected by each of these sensors may be processed by the computer system 640 to generate control signals that control the operation of the semi-truck 700. The images and location information may be processed to identify or detect objects around or in the path of the semi-truck 700 and control signals may be emitted to adjust the throttle 684, steering 686 or brakes 688 as needed to safely operate the semi-truck 700. The computer system 640 may include computer code which operates to perform a process such as the process 300 of FIG. 3 to transmit data from the semi-truck 700 to a remote monitoring system using a low bandwidth protocol. The computer system 640 may also cause control information to be received (and acted upon) from the remote monitoring system such as via an inbound command node 214. While illustrative example sensors and actuators or vehicle systems are shown in FIG. 6, those skilled in the art, upon reading the present disclosure, will appreciate that other sensors, actuators or systems may also be used.

The control system 600 may include a computer system 640 (such as a computer server) which is configured to provide a computing environment in which one or more software or control applications (such as items 660-682) may be executed to perform the processing described herein. In some embodiments, the computer system 640 includes components which are deployed on a semi-truck 700 (e.g., they may be deployed in a systems rack 740 positioned within a sleeper compartment 712 as shown in FIG. 7C). The computer system 640 may be in communication with other computer systems (not shown in FIG. 6, but shown as items 260, 270 and 290 of FIG. 2) that may be remote from the semi-truck 700 (e.g., the computer systems may be in communication via a network connection).

According to various embodiments described herein, the computer system 640 may be implemented as a server. In some embodiments, the computer system 640 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 640 and the control system 600. For example, as shown, applications may be provided which perform active learning machine processing (active learning component 660) to process images captured by one or more cameras 612 and information obtained by lidars 614. For example, image data may be processed using deep learning segmentation models 662 to identify objects of interest in those images (such as, for example, other vehicles, construction signs, etc.). Here, deep learning segmentation may be used to identity lane points within the lidar scan. As an example, the system may use an intensity based voxel filter to identify lane points within the lidar scan.

Lidar data may be processed by the machine learning applications 664 to draw or identify bounding boxes on image data to identify objects of interest located by the lidar sensors. Information output from the machine learning applications may be provided as inputs to object fusion 668 and vision map fusion 670 software components which may perform processing to predict the actions of other road users and to fuse local vehicle poses with global map geometry in real-time, enabling on-the-fly map corrections. For example, data from object fusion 668 may be used as the source of tracked object data that may be transmitted from the semi-truck 700 to one or more remote monitoring systems using low bandwidth techniques of the present invention.

The outputs from the machine learning applications may be supplemented with information from radars 616 and map localization 666 application data (as well as with positioning data). These applications allow the control system 600 to be less map reliant and more capable of handling a constantly changing road environment. Further, by correcting any map errors on the fly, the control system 600 can facilitate safer, more scalable and more efficient operations as compared to alternative map-centric approaches. Information is provided to prediction and planning application 672 which provides input to trajectory planning 674 components allowing a trajectory 676 to be generated in real time based on interactions and predicted interactions between the semi-truck 700 and other relevant vehicles in the environment. The generated trajectory 676 may be the source of a computed trajectory of the vehicle which may be transmitted to one or more remote monitoring systems using the low bandwidth features of the present invention. In some embodiments, for example, the control system 600 generates a sixty second planning horizon, analyzing relevant actors and available trajectories. The plan that best fits multiple criteria (including safety, comfort and route preferences) is selected and any relevant control inputs needed to implement the plan are provided to controllers 682 to control the movement of the semi-truck 700.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computer system 640 which may represent or be integrated in any of the above-described components, etc. FIG. 6 is not intended to suggest any limitation as to the scope of use or functionality of embodiments of the application described herein. The computer system 640 is capable of being implemented and/or performing any of the functionality set forth hereinabove.

The computer system 640 may be described in the general context of computer system-executable instructions, such as program modules, being executed by a computer system. Generally, program modules may include routines, programs, objects, components, logic, data structures, and so on that perform particular tasks or implement particular abstract data types. The computer system 640 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 640 is shown in the form of a general-purpose computing device. The components of the computer system 640 may include, but are not limited to, one or more processors (such as CPUs 642 and GPUs 644), a communication interface 646, one or more input/output interfaces 648 and one or more storage devices 650. Although not shown, the computer system 640 may also include a system bus that couples various system components including system memory to the CPUs 642. In some embodiments, the input/output interfaces 648 may also include a network interface. For example, in some embodiments, some or all of the components of the control system 600 may be in communication via a controller area network ("CAN") bus or the like.

The storage device 650 may include a variety of types and forms of computer readable media. Such media may be any available media that is accessible by computer system/server, and it may include both volatile and non-volatile media, removable and non-removable media. The storage device 650 may include storage components such as the storage device 204 of FIG. 2. System memory, in one embodiment, implements the flow diagrams of the other figures. The system memory can include computer system readable media in the form of volatile memory, such as random access memory (RAM) and/or cache memory. As another example, storage device 650 can read and write to a non-removable, non-volatile magnetic media (not shown and typically called a "hard drive"). Although not shown, the storage device 650 may include one or more removable non-volatile disk drives such as magnetic, tape or optical disk drives. In such instances, each can be connected to the bus by one or more data media interfaces. Storage device 650 may include at least one program product having a set (e.g., at least one) of program modules that are configured to carry out the functions of various embodiments of the application.

FIGS. 7A-7C are diagrams illustrating exterior views of a semi-truck 700 that may be used in accordance with example embodiments. Referring to FIGS. 7A-7C, the semi-truck 700 is shown for illustrative purposes only-those skilled in the art, upon reading the present disclosure, will appreciate that embodiments may be used in conjunction with a number of different types of vehicles. The example semi-truck 700 shown in FIGS. 7A-7C is one configured in a common North American style which has an engine 706 forward of a cab 702, a steering axle 714 and two drive axles 716. A trailer (not shown) is attached to the semi-truck 700 via a fifth-wheel trailer coupling that is provided on a frame 718 positioned over the drive axles 716. A sleeper compartment 712 is positioned behind the cab 702. A number of sensors are positioned on different locations of the semi-truck 700. For example, sensors may be mounted on a roof of the cab 702 on a sensor rack 720. Sensors may also be mounted on side mirrors 710 as well as other locations. As will be discussed, sensors may be mounted on the bumper 704 as well as on the side of the cab 702 or other locations. For example, a rear-facing radar 736 is shown as mounted on a side of the cab 702 in FIG. 7A. Embodiments may be used with other configurations of trucks or other vehicles (e.g., such as semi-trucks having a cab over or cab forward configuration or the like). For example, embodiments may be used in conjunction with other types of vehicles that tow a trailer to allow improved information about trailer orientation. In general, and without limiting embodiments of the present invention, features of the present invention may be used with desirable results in vehicles that carry cargo over long distances, such as long-haul semi-truck routes.

FIG. 7B is a front view of the semi-truck 700 and illustrates a number of sensors and sensor locations. The sensor rack 720 may secure and position several sensors including a long range lidar 722, long range cameras 724, GPS antennas 734, and mid-range front facing cameras 726. The side mirrors 710 may provide mounting locations for rear-facing cameras 728 and mid-range lidar 730. A front radar 732 may be mounted on the bumper 704. It will be appreciated to one of skill in the art that sensors may be mounted or installed on other locations and the types of sensors at various locations are not limited to the exemplary embodiments therein as the locations, sensor types and mounts depicted in FIGS. 7A-7C are for illustrative purposes only. Referring now to FIG. 7C, a partial view of the semi-truck 700 is shown which shows an interior of the cab 702 and the sleeper compartment 712. In some embodiments, portions of the control system 600 of FIG. 6 are deployed in a systems rack 740 in the sleeper compartment 712, allowing easy access to components of the control system 600 for maintenance and operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method performed by a user device for remote monitoring of an autonomous vehicle, comprising:

transmitting to a remote system an identification of the autonomous vehicle to be monitored;

in response to providing the identification to the remote system, receiving from the remote system a plurality of data frames associated with the autonomous vehicle, the plurality of data frames having one or more of a plurality of data types, the plurality of data types comprising vehicle signal data, vehicle diagnostic data, and object data, each frame in the plurality of data frames comprising a timestamp and a sequence ID;

assembling the received plurality of data frames based on data type, sequence ID, and timestamp to reconstruct an ordered sequence of telemetry data for the autonomous vehicle;

making a determination that a particular data type is one that requires a particular context map, the particular context map associating each of a plurality of message identifiers with a corresponding plurality of message labels, wherein data frames of the particular data type each further comprise at least one message identifier;

based on the determination, generating using the particular context map a message label for each data frame of the particular data type based on the corresponding message identifier; and displaying the plurality of data frames and generated message labels on a user interface of the user device.

2. The method of claim 1, wherein data frames of the particular data type each further comprise a context identifier, the method further comprising selecting the particular context map from a plurality of context maps based on the context identifier.

3. The method of claim 1, further comprising transmitting to the remote system the particular data type, wherein the plurality of data frames are of the particular data type.

4. The method of claim 1, wherein the identification of the autonomous vehicle is provided by a remote user.

5. The method of claim 1, wherein the generated message label for each data frame is of a greater size than the corresponding message identifier.

6. The method of claim 1, wherein the particular context map is a current context map.

7. The method of claim 1, wherein the particular data type is vehicle diagnostic data.

8. The method of claim 7, wherein the particular context map is a mapping of vehicle diagnostic data status names to integers.

9. The method of claim 1, further comprising:

displaying the plurality of data frames and generated message labels in a first display area within the user interface;

receiving streaming data from the autonomous vehicle; and displaying the streaming data in the user interface in a second display area within the user interface, separate from the first display area.

10. The method of claim 9, wherein displaying the streaming data is time-synchronized with displaying the plurality of data frames.

11. A non-transitory computer-readable medium storing a program for remote monitoring of an autonomous vehicle, which when executed by a computer, configures the computer to:

transmit to a remote system an identification of the autonomous vehicle to be monitored;

in response to providing the identification to the remote system, receive from the remote system a plurality of data frames associated with the autonomous vehicle, the plurality of data frames having one or more of a plurality of data types, the plurality of data types comprising vehicle signal data, vehicle diagnostic data, and object data, each frame in the plurality of data frames comprising a timestamp and a sequence ID;

assemble the received plurality of data frames based on data type, sequence ID, and timestamp to reconstruct an ordered sequence of telemetry data for the autonomous vehicle;

make a determination that a particular data type is one that requires a particular context map, the particular context map associating each of a plurality of message identifiers with a corresponding plurality of message labels, wherein data frames of the particular data type each further comprise at least one message identifier;

based on the determination, generate using the particular context map a message label for each data frame of the particular data type based on the corresponding message identifier; and display the plurality of data frames and generated message labels on a user interface.

12. The non-transitory computer-readable medium of claim 11, wherein data frames of the particular data type each further comprise a context identifier, and wherein the program, when executed by the computer, further configures the computer to select the particular context map from a plurality of context maps based on the context identifier.

13. The non-transitory computer-readable medium of claim 11, wherein the generated message label for each data frame is of a greater size than the corresponding message identifier.

14. The non-transitory computer-readable medium of claim 11, wherein the particular data type is vehicle diagnostic data.

15. The non-transitory computer-readable medium of claim 14, wherein the particular context map is a mapping of vehicle diagnostic data status names to integers.

16. The non-transitory computer-readable medium of claim 11, wherein the program, when executed by the computer, further configures the computer to:

display the plurality of data frames and generated message labels in a first display area within the user interface;

receive streaming data from the autonomous vehicle; and display the streaming data in the user interface in a second display area within the user interface, separate from the first display area, wherein the display of the streaming data is time-synchronized with the display of the plurality of data frames.

17. A system for remote monitoring of an autonomous vehicle, comprising:

a memory configured to store data frames received from a remote system; and a processor configured to:

transmit to the remote system an identification of the autonomous vehicle to be monitored;

in response to providing the identification, receive from the remote system a plurality of data frames associated with the autonomous vehicle, the plurality of data frames having one or more of a plurality of data types, the plurality of data types comprising vehicle signal data, vehicle diagnostic data, and object data, each frame in the plurality of data frames comprising a timestamp and a sequence ID;

assemble the received plurality of data frames based on data type, sequence ID, and timestamp to reconstruct an ordered sequence of telemetry data for the autonomous vehicle;

make a determination that a particular data type is one that requires a particular context map, the particular context map associating each of a plurality of message identifiers with a corresponding plurality of message labels, wherein data frames of the particular data type each further comprise at least one message identifier;

based on the determination, generate using the particular context map a message label for each data frame of the particular data type based on the corresponding message identifier; and display the plurality of data frames and generated message labels on a user interface, wherein the generated message label for each data frame is of a greater size than the corresponding message identifier.

18. The system of claim 17, wherein data frames of the particular data type each further comprise a context identifier, and wherein the processor is further configured to select the particular context map from a plurality of context maps based on the context identifier.

19. The system of claim 17, wherein the particular data type is vehicle diagnostic data, and the particular context map is a mapping of vehicle diagnostic data status names to integers.

20. The system of claim 17, wherein the processor is further configured to:

display the plurality of data frames and generated message labels in a first display area within the user interface;

receive streaming data from the autonomous vehicle; and display the streaming data in the user interface in a second display area within the user interface, separate from the first display area.

* * * * *